United States Patent [19]

McBreen

[11] 4,000,005

[45] Dec. 28, 1976

[54] METHOD FOR MAKING A NICKEL POSITIVE ELECTRODE FOR AN ALKALINE BATTERY

[75] Inventor: James McBreen, Pleasant Ridge, Mich.

[73] Assignee: General Motors Corporation, Detroit, Mich.

[22] Filed: Jan. 8, 1976

[21] Appl. No.: 647,624

[52] U.S. Cl. .............................. 429/212; 427/126
[51] Int. Cl.$^2$ .................................. H01M 4/38
[58] Field of Search ... 136/28, 29, 120 R, 120 FC; 427/190, 201, 369, 372

[56] References Cited

UNITED STATES PATENTS

| 3,442,715 | 5/1969 | Yee et al. | 136/120 FC X |
| 3,457,113 | 7/1969 | Deibert | 136/120 FC X |
| 3,954,501 | 5/1976 | Rampel | 136/120 R X |

Primary Examiner—John H. Mack
Assistant Examiner—C. F. Lefevour
Attorney, Agent, or Firm—Lawrence B. Plant

[57] ABSTRACT

A nickel alkaline storage battery electrode made by vacuum impregnating a porous conductive support with a coagulum of nickel hydroxide, cobalt hydroxide and graphite particles entrained in a three dimensional, reticulated, open-celled polyvinylidene fluoride binder, and thereafter compressing and drying the impregnated support. The coagulum is formed by mechanically suspending the hydroxide and graphite particles in a medium which is not a solvent for the polyvinylidene fluoride in a separate operation dissolving the polyvinylidene fluoride in a solvent which is only slowly soluble in the suspension medium for the particles, and thereafter adding the polyvinylidene fluoride solution to, and intimately mixing it with, the suspension such that the polyvinylidene fluoride slowly precipitates and coagulates substantially uniformly throughout the solution-suspension mixture and entrains the particles therein as coagulation proceeds.

2 Claims, No Drawings

METHOD FOR MAKING A NICKEL POSITIVE ELECTRODE FOR AN ALKALINE BATTERY

BACKGROUND OF THE INVENTION

This invention relates to the making of nickel positive electrodes for secondary, alkaline storage batteries, and more particularly to a unique method of distributing and supporting fine particles of nickel hydroxide and graphite throughout the electrode so as to achieve maximum utilization of the nickel hydroxide, and produce an active mass particularly useful with a lightweight grid/conductive support.

One of the major drawbacks to the more extensive use of nickel alkaline batteries (e.g., nickel-cadmium, nickel-zinc, etc.) is the high cost of the nickel (i.e., nickel hydroxide) positive electrodes. Originally such electrodes utilized porous nickel plaques of sintered carbonyl nickel powder impregnated with nickel salts which were then converted into nickel hydroxide. Typically this was accomplished by filling the pores of the nickel plaque with an aqueous solution of a nickel salt and subsequently converting the salt to the hydroxide by chemical, electrochemical or thermal processes. The process normally required several repetitions to introduce the desired amount of nickel hydroxide into the plaque and utilized unnecessarily high amounts of nickel which added considerable cost and weight to the battery.

Later developed electrodes eliminate the expensive nickel plaques. Some are made by milling (i.e., calendaring) nickel hydroxide, graphite, binder and a plasticizer together and then roll bonding it to a current collecting grid. Porosity is obtained in these electrodes by various techniques. In one case, a mixture of two immiscible thermoplastic resins is used as the initial binder, and later one of the resins is leached from the mass with a suitable solvent. The active electrode material is retained and bound in a microporous matrix of the insoluble thermoplastic resin. An additional sintering step may be employed to remove any remaining soluble resin. While materials-wise this technique is less expensive than the sintered plaque electrode, manufacturing-wise it was still quite involved and produces electrodes with the utilization efficiencies [i.e., ampere-hrs/gram of $Ni(OH)_2$] less [i.e., about 0.23–0.24 A·h/g $Ni(OH)_2$] than are obtained with the present invention.

Still other proposed techniques include: (1) percipitating nickel hydroxide as a slurry from a solution of a nickel salt and vacuum impregnating a porous nickel conductor with the slurry; (2) applying a layer of an aqueous paste of nickel hydroxide, nickel power and a binder to a metallic substrate, compressing it to remove excess water, drying it and compressing it again to achieve intimate nickel hydroxide-nickel metal interfacial contact; (3) mixing nickel hydroxide, graphite, dimethylformamide, polyvinylidene fluoride and dimethylacetamide together, casting it into a thin film (e.g., 0.7–0.8 mm), drying it for a short while, immersing it in water to coagulate the polyvinylidene fluoride and finally wrapping it with a current collector and fabric separator to form the electrode. Each of these processes are complex, time consuming and from available data appear to offer no advantages, utilization-efficiency-wise, over the solvent-extracted-resin technique.

It is therefore an object of this invention to provide a simple process for manufacturing efficient, lightweight, low cost nickel electrodes for secondary nickel alkaline storage batteries whereby nickel hydroxide and graphite particles are bound together in a three dimensional, open-celled polyvinylidene fluoride matrix so as to achieve maximum utilization of the nickel hydroxide. This and other objects of this invention will become more apparent from the detailed description which follows.

BRIEF SUMMARY OF THE INVENTION

The process of the present invention comprehends mechanically suspending (e.g., in a Waring blender) comminuted nickel hydroxide and graphite in a suspension medium (e.g., isopropyl alcohol) which is not a solvent for polyvinylidene fluoride (i.e., Kynar), adding thereto a solution of polyvinylidene fluoride in a solvent (e.g., acetone) which is slowly soluable in the suspension medium, blending for a sufficient time for the polyvinylidene fluoride to coagulate, drawing the blend through a conductive grid which separates the coagulum from the medium-solvent, wet pressing the coagulum-impregnated grid and finally drying the electrode. The dissolution rate of the polyvinylidene fluoride solvent in the suspension medium is sufficiently slow that, as the polyvinylidene fluoride solution is added to the suspension in the blender, it rapidly and substantially uniformly mixes therewith before any substantial dissolution of the solvent occurs. Thereafter the solvent can dissolve in the suspension medium at its own rate and the polyvinylidene fluoride precipitates and coagulates substantially uniformily throughout the solution. As coagulation proceeds, the nickel hydroxide and graphite are entrained in the coagulated polyvinylidene fluoride. As will be pointed out hereinafter, medium-solvent combinations other than isopropanolacetone are useful so long as the dissolution rate of the solvent in the medium does not substantially exceed that of the isopropanol-acetone combination. Likewise, small amounts (i.e., up to about 5 weight percent) of cobalt hydroxide may be added to the nickel hydroxide to improve the charge efficiency of the electrode as is already known to those skilled in the art.

After the formation of the coagulum in the blender, as above, a porous conductive support is filled with and covered by the coagulum, by passing the blender mix through the support and separating the medium-solvated solvent from the coagulum. While I prefer to use a conventional paper making technique (i.e., vacuum table), a centrifuge could also be used to effect the separation and impregnation. According to my preferred practice, a 20 mesh, 5 mils thick expanded metal screen is laid atop a vacuum table which is covered with newsprint (i.e., porous paper). A frame is placed over the screen and has a mold/cavity therein for receiving and containing the mixture from the blender. The frame is about 2 centimeters thick and has a 12 cm × 12 cm central cavity into which the blender mix is poured over the screen. A vacuum (e.g., about 20–25 inches of Hg) is drawn and the medium-solvated solvent sucked through the porous support leaving the nickel hydroxide, cobalt hydroxide, graphite and polyvinylidene fluoride coagulum within the interstices and built up on one side of the support. By turning the support over during this operation an additional thickness of coagulum may be built up on the other side of the screen if desired. While virtually any thickness electrode can be made by my process, I prefer to cast the coagulum to a thickness of about 0.180 centimeters, and this is later reduced to about 0.076 centimeters by wet pressing at about 40 Kg/cm$^2$ to about 80 Kg/cm$^2$ (preferably about 73 Kg/cm$^2$) after the medium-solvated solvent is removed. Following wet pressing the electrode is dried in an oven at about 100° C. for about 3 minutes and finally pressed again, at about the same pressure as before, to ensure uniform thickness, sizing, etc. of the electrode. The pressed and dried coagulum thus produced is not only conductive and porous, but also quite self-supporting, so that very thin screens (i.e., conductive supports) may be used in relation to the overall thickness of the finished electrode. Hence lightweight, materials-efficient electrodes are producible by my process.

In accordance with my invention and in order to achieve uniform distribution of the hydroxide and graphite in the coagulum without coating thereof by the polyvinylidene fluoride solution must be substantially uniformly mixed with the particle suspension in the blender before any significant coagulation begins. This is achieved by mechanically dispersing (e.g., in a Waring blender) the hydroxide and graphite particles in a medium which will not appreciably dissolve polyvinylidene fluoride, but will slowly dissolve certain solvents used to prepare the polyvinylidene fluoride solution. While isopropyl alcohol is my preferred suspension medium, other mediums such as water-alcohol (e.g., tertiary butyl alcohol) mixtures are also useful as well as water mixtures of certain of the polyvinylidene fluoride solvents mentioned hereinafter. The suspension in the blender, preferably comprises about 10 cubic centimeters of isopropanol for every gram of dry hydroxidegraphite mix, though this may vary substantially without departing from my invention.

The polyvinylidene fluoride is then separately dissolved in a solvent which is selected for its slow rate of solubility in the suspension medium for the hydroxide-graphite particles. This solution is then added to the suspension in the blender, rapidly mixed therewith before any substantial dissolution of the solvent occurs. Eventually, of course, the solvent dissolves in the medium and the polyvinylidene fluoride precipitates out of the solution, coagulating as it precipitates, and entraining the hydroxide-graphite particles in the resulting coagulum. When isopropanol is used as the suspension medium, acceptable solvents for the polyvinylidene fluoride include my preferred mixture (i.e., 1:1) of dimethylformamide and methyl-ethyl-ketone, as well as others such as acetone, methyl-ethyl-ketone, ethyl acetate, dimethylformamide, dimethylacetamide, N-Methyl-2-Pyrolidone, dimethylsulfoxide, and triethylphosphate. The concentration of the polyvinylidene fluoride in the solvent is preferably such to produce a viscous solution having a consistency like that of heavy syrup. Much lower polyvinylidene fluoride concentrations can be used, but it is not practical to do since more liquid must be then unnecessarily handled throughout the entire process. On the other hand, when the concentration of the polyvinylidene fluoride is too high the resulting solution is too viscous for easy pouring into the blender and for good mixing with the suspension medium before coagulation commences. A preferred solution comprises about 5 weight percent polyvinylidene fluoride in a mixed solvent comprising one part by volume methyl-ethylketone and one part by volume dimethylformamide.

A number of conductive diluents may be used in the electrode made according to this invention including graphite, silicon carbide, nickel, etc. These materials impart electrical conductivity to the coagulum but do not enter into the electrochemical reaction. I prefer to use powdered graphite since it is totally inert to the cell environment, lightweight, highly conductive and inexpensive. It has been observed that, at the one hour discharge rate, the percent utilization (i.e., actual capacity × 100/theoretical capacity), of the nickel hydroxide in the electrode increases rapidly as the amount of graphite therein increases up to about 30 percent by weight of the dry mix with about 23%-30% being preferred. Over about 30%, no particular benefits are achieved. The particle size of the graphite is quite significant. It has been observed that particles greater than about 5 microns in diameter have relatively poor conductivity while particles less than about 0.5 microns in diameter produce only short-lived electrodes. In this regard, electrodes with the graphite particles less than about 0.5 microns lose their conductivity after only a few cycles and the cell's electrolyte turns brown. It is believed that the nickel oxyhydroxide formed on the second and later chargings of the nickel electrode promotes oxidation of the graphite, and eventual loss thereof from the electrode. I prefer to use airspun graphite having an average particle size of about 2.5 microns which is commercially available under the name of Dixon 200-10. This material is not lost to the electrolyte during cycling, and mixes well with the nickel hydroxide particles which are themselves less than about 200 mesh.

It is important that the hydroxide and graphite particles be intimately mixed, and I prefer dry ball-milling to achieve this result. A certain minimum amount of milling seems necessary to effect intimate contact between the nickel hydroxide and the graphite particles, but excessive milling may actually cause nickel hydroxide particles to become coated with the graphite particles which tends to prevent electrolyte access to the nickel hydroxide. For low discharge rate applications, the percentage utilization of the Ni(OH)$_2$ increases with ball-milling time over a ball-milling period of about 2 hours to about 16 hours, but that for high discharge rate applications the percentage utilization of the Ni-(OH)$_2$ peaks at about 8 hours of ball-milling after which it falls off rapidly. For these later applications, I prefer ball-milling the hydroxide-graphite somewhere in the range of about 4–12 hours with about 8 hours of dry ball-milling being most preferred. Wet milling of the particles seems to increase the electrodes polarization during discharge and reduce the percentage utilization at the high rate discharges.

No more polyvinylidene fluoride is required in the electrode than is needed to give it adequate strength. Hence when using thin flexible, conductive supports, the dry coagulum itself should have sufficient polyvinylidene fluoride to make it virtually self supporting, and this is achievable with as little as about 6 percent by weight polyvinylidene fluoride. Coagulums having adequate green strength have been prepared from 1 cubic centimeter of a 5 percent by weight polyvinylidene solution (in 1:1 methyl-ethyl-ketone and dimethylformamide) per gram of the dry mix. Where larger conductive supports are used, such as porous nickel plaques or open-called nickel foams, lesser amounts of polyvinylidene fluoride may be used in the coagulum.

After the mixing of the two liquids, the coagulation of the polyvinylidene fluoride and the entrainment of the hydroxides-graphite therein, the resultant blender mix is cast into/onto the porous support, and the excess liquid drawn off. When the polyvinylidene fluoride binder is formed in the manner described, the hydroxides-graphite are held within the open cells of the binder but are not coated by it. The wet electrode is then wet pressed to establish good electrical conductivity within the electrode and compress it down to the design thickness for the particular electrode. Pressures in the range of about 50 Kg/cm$^2$ to about 80 Kg/cm$^2$ provide good interparticle contact. Below about 50 Kg/cm$^2$ the contact is insufficient, conductivity-wise, and above about 80 Kg/cm$^2$ a skin apparently forms on the electrode's faces which inhibits the electrochemical activity in the interior of the electrode. It has been observed that pressures of about 73 Kg/cm$^2$ yield electrodes with a maximum percentage utilization of the nickel hydroxide.

In one embodiment, and by way of example, an electrode is prepared which comprises 66.5 percent by weight nickel hydroxide, 3.5 percent by weight cobalt hydroxide, 23.4 percent by weight graphite and 6.6 percent by weight polyvinylidene fluoride resin on a supporting expanded nickel screen (i.e., 5 mils thick and 20 mesh). Green nickel hydrate and cobalt hydrate powders (i.e., less than about 200 mesh) are dry blended for about 4 hours in a ball mill with 2.5 micron sized air-spun graphite. This powder mix is added to isopropanol in a Waring blender by mixing 1 gram of powder per 10 cubic centimeters (cc's) of isopropanol and mixed for at least about two (2) minutes to mechanically suspend the particles in the isopropanol. In a separate operation, a 5 weight percent solution of polyvinylidene fluoride resin is prepared by dissolving the resin in a mixed solvent comprising a 1:1 ratio of methyl-ethyl-ketone and dimethylformamide. 1 cubic centimeter of this solution, is then added to the blender for every 10 cubic centimeters of suspension in the 2 liquids blended for about 2 minutes until the methyl-ethyl-ketone and dimethylformamide solvent dissolves in the isopropanol, and the polyvinylidene fluoride precipitates out and coagulates throughout the liquid in the blender forming a coagulum of particles entrained within the open cells of the polyvinylidene fluoride. The expanded nickel screen is laid atop a porous paper (i.e., newsprint) sheet laying on the porous top of a vacuum table. A 2 cm thick frame having a 12 cm × 12 cm central opening is placed atop the screen, and the blender mix cast therein. A vacuum is drawn and the isopropanol, methyl-ethyl-ketone and dimethylformamide removed from the coagulum which is left in and on the nickel screen. Sufficient blender mix is used to provide an electrode blank having a thickness of 0.180 centimeters after the liquid has been drawn off. The electrode blank is then wet pressed at 73 Kg/cm$^2$ which reduces its thickness to about 0.076 cm, and dried in an oven for 3 minutes at 100° C. A second pressing at the same pressure ensures uniformity in thickness across the electrode.

Electrodes were cut (i.e., 10.2 cm × 10.2 cm) from the thus prepared electrode blank, nickel current collecting tabs attached thereto and were assembled into nickel-cadmium cells (i.e., standard sintered cadmium electrodes) with a separator system comprising a single layer of polyamide felt, heat sealed at the edges, followed by an open "U" of radiation grafted polyethylene separator. The cells were formed in a room temperature electrolyte comprising 37.5 weight percent potassium hydroxide and 12 grams per liter of lithium hydroxide. A 2-cycle formation was used in which the electrodes were twice charged at a current density of 1.6 milliamperes per square centimeter (ma/cm$^2$) to 200 percent of their theoretical capacity, and then discharged at a rate of 3.5 ma/cm$^2$. The electrodes were then charged again at a rate of 1.6 milliamperes per centimeter to 200 percent of their theoretical capacity and were then ready for cycle (i.e., charging/discharging) testing. During cycle the electrodes were charged at the 1.6 ma/cm$^2$ rate to about 110 percent of their actual capacity, and discharged at the 3 hour rate (i.e., 3.5 ma/cm$^2$) to a cutoff voltage of 0.8 volts. The electrodes thus prepared and tested displayed an unusually high nickel hydroxide utilization of about 0.27 to 0.29 ampere hours per gram (A·h/g) of Ni(OH)$_2$, and a total electrode weight (including the nickel screen, the current collector tab, and the coagulum) of 5.95 grams per ampere hour (g/A·hr).

Other electrodes, 0.076 cm thick, made as above were cut into rectangles (i.e., 7.3 cm × 4.45 cm) and contained 2.42 grams of Ni(OH)$_2$ (i.e., a theoretical capacity of 0.7 A-hr). These electrodes were tested singly in nickel-cadmium cells in which the nickel electrodes were wrapped in a single open "U" of 0.013 cm polyamide felt followed by a "U" of radiation-grafted polyethylene separator. The wrapped electrode was assembled with two cadmium electrodes (i.e., 2.1 A-hr each) in a cell case, wet down with electrolyte (7M KOH + 0.5M LiOH), soaked for two hours, and then vacuum treated to remove gas bubbles. These cells were given two cycles which consisted of a 16 hour charge at 0.1 amperes (1.54 ma/cm$^2$) followed by a 200 ma (3.08 ma/cm$^2$) discharge to 0.8 volts. Subsequent cycles involved charging at 0.1 ampere for 8 hours prior to discharging. One of these nickel-cadmium test cells was deep cycled for 173 cycles at the 3 hour discharge rate, and lost only 15 percent of its initial capacity in the first 162 cycles. On the 163rd cycle, the cell lost its electrolyte and the capacity dropped by about 40 percent. Some recovery in capacity was obtained by adding water, but the electrode was apparently damaged when the cell dried out.

Nickel electrodes made as above were also tested in state-of-the-art nickel-zinc cells. The particular nickel-zinc cells tested included 3 basic types. The first had a nominal capacity of 1.4 A-hr and comprised two of the nickel electrodes (7.3 cm × 4.45 cm × 0.076 cm), and 3 negative electrodes (7.6 cm × 4.75 cm × 0.051 cm). The separator system included one (1) thickness of 0.010 cm nonwoven polyamide felt, supplied by the Pellon Corp. and identified as their material 2504K4, 1 thickness of 0.003 cm acrylic acid grafted polyethylene from the RAI Corp. and identified as their material P-2291, and two thickness of 0.003 cm unplasticized cellophane from E. I. duPont de NeMours and identified as their material PUDO-300. The second cell type had a nominal capacity of 4.2 A-hr and comprised 6 of the aforesaid nickel electrodes, 7 zinc electrodes, and the same separator system as in the previous example. The third cell type had a nominal capacity of 56 A-hr, and comprised 16 nickel electrodes (i.e., 15.2 cm × 12.7 cm × 0.076 cm), 17 zinc electrodes (i.e., 15.9 cm × 14.0 cm × 0.051 cm), and a separator system comprising one thickness of the 0.010 cm nonwoven polyamide felt (2504K4), one thickness of 0.003 cm acrylic acid grafted polyethylene (P-2291), and one thickness of 0.00076 cm fibrous sausage (FSC) casing from Union Carbide. These cells were formed at room temperature with two deep cycles consisting of a 100 percent overcharge at the 8 hour rate followed by a deep discharge at the 3 hour rate. The overcharged zinc was converted to zinc oxide by discharging the cell through a 0.5-ohm resistor overnight. During discharge, hydrogen was evolved from the nickel electrode. On subsequent cycles the capacity of the nickel electrode could be maintained by giving the cell a five percent overcharge at the 8 hour rate on each cycle. Tests on these nickel-zinc cells showed that the nickel electrodes were not the limiting factor in the life of the cells, that the nickel electrodes could be subjected to considerable electrochemical abuse without being damaged, and that significantly less (i.e., about half) nickel is needed to produce a given ampere-hour of capacity than is required by sintered nickel electrodes.

While I have disclosed my method of making nickel electrodes in terms of specific embodiments thereof, I do not intend to be limited thereto, but rather only to the extent set forth in the claims which follow.

I claim:

1. In a method of making low-nickel-content nickel electrodes for use in secondary alkaline batteries which includes the step of impregnating a porous, conductive support with a coagulum comprising a mixture of nickel hydroxide and graphite particles in a polyvinylidene fluoride binder the improvement comprising:

mechanically suspending said mixture in a liquid medium which is not a solvent for said binder, said mixture comprising up to about 30 percent by weight graphite particles which vary in size from about 0.5 microns to about 5.0 microns and the balance substantially nickel hydroxide having a particle size of less than about 200 mesh;

preparing a viscous solution of said binder dissolved in a solvent which is sufficiently slowly soluble in said medium that, with agitation, said viscous solution will freely mix with said suspension before any substantial dissolution of said solvent in said medium occurs;

intimately blending said viscous solution with said suspension and thereafter forming said coagulum by allowing said binder to slowly precipitate and coagulate substantially uniformly throughout the solution-suspension mixture and to entrain said particles therein;

forcing the solution from the previous step through said support to separate the coagulum from the solution and to impregnate said support with said coagulum, the binder portion of which has an open-celled reticulated structure the cells of which are filled with said particles;

compressing the thusly impregnated support with sufficient pressure to pack the particles together so as to enhance the electrical contact therebetween and maximize the percentage utilization of the nickel hydroxide therein; and drying the thus impregnated and compressed support.

2. A nickel electrode made in accordance with the process set forth in claim 1.

* * * * *